(No Model.)

J. W. CALL.
PIPE COUPLING.

No. 304,611. Patented Sept. 2, 1884.

Witnesses:
Wm. A. Rosenbaum
A. A. Thomas.

Inventor:
John W. Call
by J. S. Duffie,
Atty.

UNITED STATES PATENT OFFICE.

JOHN WILLEM CALL, OF LITTLE ROCK, ARKANSAS, ASSIGNOR OF ONE-HALF TO SARAH B. PASCHAL, OF SAME PLACE.

PIPE-COUPLING.

SPECIFICATION forming part of Letters Patent No. 304,611, dated September 2, 1884.

Application filed February 18, 1884. (No model.)

*To all whom it may concern:*

Be it known that I, JOHN WILLEM CALL, a citizen of United States, residing at Little Rock, in the county of Pulaski and State of Arkansas, have invented certain new and useful Improvements in Pipe-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improvements in refrigerators or ice-machines; and it consists in the manner of coupling the pipes that convey the ammonia or other fluid to and from the pumps, effectually preventing the ammonia or gases from escaping; but, while particularly designed for this purpose, my invention also applies to all kinds of round piping and for all like purposes.

Figure 1:
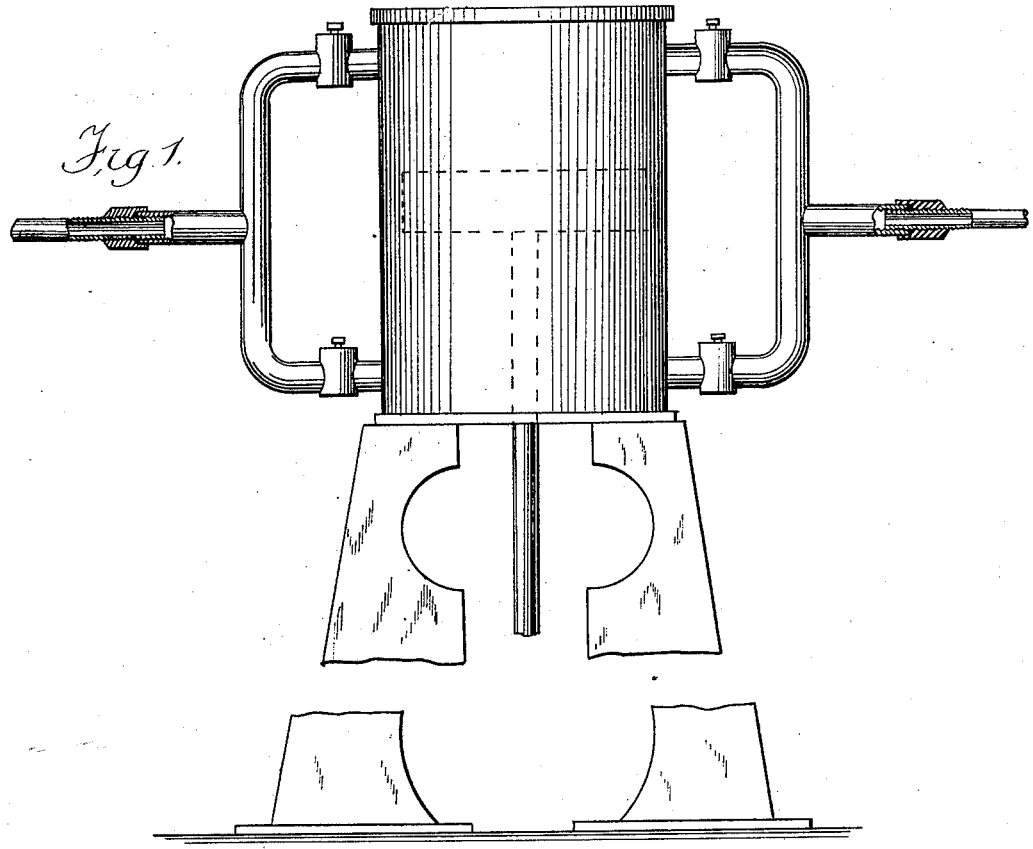
Figure 3:
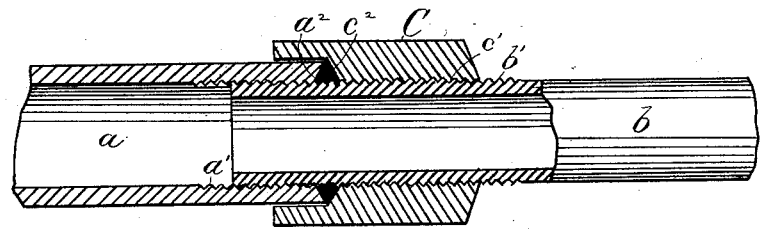
Figure 2:
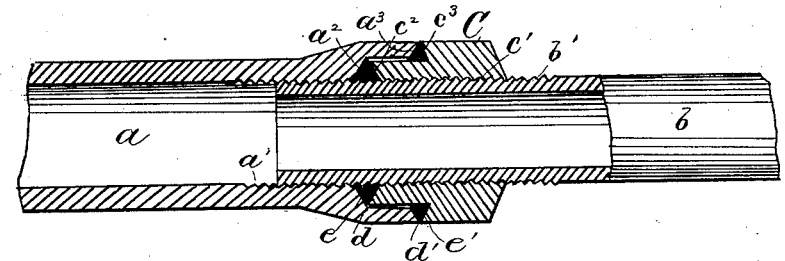

In the accompanying drawings, Figure 1 represents a side elevation of an ammonia-pump, showing the pipe-connections. Fig. 2 represents a longitudinal sectional view of my coupling device. Fig. 3 represents a modified form of the same.

My invention is described as follows: In Fig. 2, $a$ is a pipe with threads $a'$ cut on its inside. $b$ is a pipe having threads $b'$ cut on the outside of same, corresponding to threads $a'$ of pipe $a$. This pipe $b$ is small enough to be screwed into the threaded end of pipe $a$. $c$ is a lock-nut having threads $c'$ cut on its inside, which closely fit into threads $b'$ of pipe $b$. On this lock-nut $c$ are two shoulders, $c^2 c^3$, their faces inclining forward at an angle of about ten or fifteen degrees. The pipe $a$ also has two shoulders, $a^2 a^3$, corresponding with shoulders $c^2 c^3$ of lock-nut $c$, and intended to abut against the same, the faces of which are also inclined forward at an angle of about ten or fifteen degrees. When these shoulders are brought together, they form two V-shaped openings, $d d'$, one, $d$, around pipe $b$, and the other, $d'$, around the lock-nut $c$. In these V-shaped openings are gaskets $e e'$, of rubber or other suitable material.

To connect my coupling I screw the lock-nut $c$ on the threaded end of pipe $b$; then I put on gasket $e$ and bring it up to face $c^2$; then put on gasket $e'$ and bring it up against face $c^3$; then I screw the threaded end of pipe $b$ into the threaded end of pipe $a$ such distance as I deem proper; then I screw the lock-nut home, bringing its faces $c^2 c^3$ against shoulders $a^2 a^3$ of pipe $a$. This compacts the gaskets so completely and forces them to fill up any interstices between the threads $b'$ and $c'$ and $a'$ and $a^2$ that no fluid or gas can possibly escape.

Having thus described my invention, what I claim as new, and desire to secure by Letters Patent, is—

1. The combination of pipe $a$, having slanting shoulders $a^2 a^3$, with lock-nut $c$, having shoulders $c^2 c^3$, slanting opposite to said pipe-shoulders, and the pipe $b$, entering said pipe $a$ and lock-nut $c$, substantially as shown and described, and for the purposes set forth.

2. The combination of pipe $b$, having threads $b'$ to be screwed into the threaded end of pipe $a$, pipe $a$, having slanting shoulders $a^2 a^3$, and lock-nut $c$, having threads $c'$, fitting into threads $b'$ of pipe $b$, and having slanting shoulders $c^2 c^3$, arranged to abut against shoulders $a^2 a^3$ of pipe $a$, and to compress the gaskets $e e'$, substantially as shown and described.

3. The combination of pipe $a$, screw-threaded internally, and pipe $b$, having exterior screw-threads, as described, with lock-nut $c$, screwing onto pipe $b$, and gasket $c^2$, substantially as shown and described, and for the purposes set forth.

In testimony whereof I affix my signature in presence of two witnesses.

JOHN WILLEM CALL.

Witnesses:
   J. W. VOGLER,
   JOHN L. COOK.